United States Patent [19]

Athanassiu

[11] Patent Number: 4,674,526

[45] Date of Patent: Jun. 23, 1987

[54] SWITCHING VALVE

[75] Inventor: Christos Athanassiu, Winchester, Mass.

[73] Assignee: Bellofram Corporation, Burlington, Mass.

[21] Appl. No.: 907,198

[22] Filed: Sep. 12, 1986

[51] Int. Cl.[4] ............................................. F16K 11/044
[52] U.S. Cl. ................................ 137/113; 137/625.5; 251/75
[58] Field of Search ...................... 137/112, 113, 625.5, 137/625.4; 251/75

[56] References Cited

U.S. PATENT DOCUMENTS

| | | | |
|---|---|---|---|
| 2,651,491 | 9/1953 | Ashton et al. | 137/113 X |
| 3,008,481 | 11/1961 | Matheson | 137/112 |
| 3,533,431 | 10/1970 | Kuenzel et al. | 137/113 |
| 3,970,100 | 7/1976 | Jones | 137/112 |
| 4,014,461 | 3/1977 | Harvill | 222/94 |
| 4,275,823 | 6/1981 | Credle, Jr. | 222/94 |
| 4,281,677 | 8/1981 | Hoffman | 137/113 |
| 4,354,518 | 10/1982 | Kuroda et al. | 137/112 |
| 4,467,941 | 8/1984 | Du | 222/1 |
| 4,493,435 | 1/1985 | Hartley | 137/113 X |

FOREIGN PATENT DOCUMENTS

| | | | |
|---|---|---|---|
| 1126436 | 3/1962 | Fed. Rep. of Germany | 137/113 |
| 1288857 | 2/1969 | Fed. Rep. of Germany | 137/625.5 |

Primary Examiner—Robert G. Nilson
Attorney, Agent, or Firm—Fay, Sharpe, Beall, Fagan, Minnich & McKee

[57] ABSTRACT

A switching valve for delivering fluids from different inlets to a pumping outlet utilizes a pressure responsive spool movable due to a pressure differential in the inlets to one position wherein one of the inlets feeds the outlet and a second position wherein the other of the inlets feeds the outlet. The spool carries a pair of umbrella valves for effectively controlling the flow of fluid to the outlets as well as a pair of biasing springs acting on each side of a piston diaphragm which has limited travel on the spool. An adjustable detent arrangement is provided on the end of the spool to keep the spool travel balanced and cooperates with the springs to furnish a snap acting valve.

16 Claims, 3 Drawing Figures

SWITCHING VALVE

BACKGROUND OF THE INVENTION

This invention relates to an improved switching valve for dispensing fluids to a pumping outlet and, more particularly, to a more sensitive, efficient valve for selectively switching between fluid sources in response to a vacuum created at one of the sources.

It is well known to use switching or change-over valves having valve elements which are movable in response to a pressure differential in one of its inlets. The valve elements generally assume one of two positions corresponding to the flow through condition where one of the inlets is connected with the outlet. Such valves are used in a variety of applications ranging from the handling of oxygen and gases in medical, industrial and aerospace areas to liquid compositions, syrups and inks in the food and beverage handling and chemical industries. Depending on the application, the switching valve may include linearly movable spools, diaphragms and springs cooperable to provide the desired degree of responsiveness or sensitivity.

For example, in U.S. Pat. No. 2,651,491, to Ashton, et al. a shuttle valve is disclosed which utilizes a movable valve spool held in position by a centrally located detent mechanism. However, the unilateral design of the detent mechanism can cause the valve spool to be unstable, resulting in jamming and wear to the valve parts. U.S. Pat. No. 3,533,431 to Kuenzel appeared to improve on the problem of instability in previous valves by employing a cylindrical valve holding and release member to provide a better snap-acting switching valve. However, this arrangement is susceptible to wear of its valve elements, in the form of O rings and lacks pressure responsiveness for certain applications. Likewise, in U.S. Pat. No. 3,008,481, Matheson's differential pressure selector is susceptable to O ring wear and must rely on continuous pressure and precision molded parts to provide reliable switching and sensitivity.

More recent developments to switching valves have focused on responsiveness through the use of bistable spring arrangements such as shown in Du U.S. Pat. No. 4,467,941 and Hartley U.S. Pat. No. 4,493,435. Du '941 discloses a diverter valve having a valve member which is biased by an over center latching spring/diaphragm assembly. This provides a snap action, sensitive valve but is vulnerable to the same O ring wear problems experienced in prior art valves and appears to require special care in maintenance and reassembly. Hartley '435 shows a selector employing a bistable leaf spring drivingly coupled to a valve element with lost motion and cooperating with a multimember actuator assembly. While this device produces automatic, snap type switching, it is a complex arrangement seemingly difficult to repair and costly to manufacture.

Thus, various attempts have been made in the prior art to upgrade sensitivity, responsiveness, and durability in switching valves by provision of different actuators, seating and sealing elements and holding arrangements. However, there remains a need in this well developed art for a versatile, switching valve which is capable of efficient switching of fluids in the presence of a pressure differential in one of the inlets of the valve without the inherent drawbacks of the prior art. For instance, in some prior devices, the mechanisms used to establish the operating positions of the valve are unbalanced and can cause the movable spools to deviate from their axially oriented direction of travel and eventually stick or bind as high frictional forces are created. This misalignment can then cause wear or loss of sealing elements and resultant leakage. In other cases, the actuator used to sense the pressure differential and move the spool or valve element produces flow interruption or timing problems. These are particularly sensitive concerns when switching valves are used in the handling of fluids having different viscosities.

Accordingly, it is a principal object of the invention to provide an improved switching valve for alternatively and automatically or manually switching fluid sources to an outlet upon detection of a pressure differential caused by one of the sources.

Another object of the inventions is the provision of a switching device having improved sensitivity and responsiveness to changes in pressure.

Another object of the invention is to provide a simple, compact switching valve with a small number of parts which is reliable in operation and easy to manufacture and maintain.

Another object of the invention is to furnish a switching valve which minimizes frictional forces, misalignment, worn parts and leakage.

A still further object of the invention is to provide a switching valve which is capable of handling a variety of fluids without sacrificing efficiency.

One of the salient features of my invention is an improved actuating and detent arrangement for the switching valve.

An attendant feature of my invention is found in the particular sealing valves used in the switching valve.

A further feature of my invention is the balanced operation of the spool in the switching valve.

Another feature of my invention is found in the snap action operation provided by the cooperation of dual spring arrangements.

SUMMARY OF THE INVENTION

The present invention is directed to an improved switching valve for alternately switching fluids which attempts to solve the drawbacks of prior changeover valves.

In a preferred embodiment, the present invention contemplates a housing formed with spaced apart fluid inlets, an outlet and recesses controlling the flow of fluid from each of the inlets to the outlet. A pressure sensitive valve member is movable in the housing due to a pressure differential in one of the fluid inlets to one position in which one of the inlets communicates with the outlet, and another position in which the other inlet communicates with the outlet. A pressure responsive sealing device is slidably disposed for limited travel on the valve member and divides the interior of the housing into two chambers, each having one of the fluid inlets. A valving device is mounted on the valve member in each of the chambers for controlling the flow of fluid from each of the inlets to the outlet. A biasing arrangement is mounted on the valve member and acts on each side of the sealing device to assist the movement of the valve member and valving devices. An adjustable detent mechanism is located at one end of the valve member for retaining the valve member at first and second positions, the biasing arrangement cooperating with the detent mechanism to ensure a snap acting switch between the first and second positions.

The sealing device is preferably composed of a piston assembly having first and second portions and a flexible, convoluted diaphragm secured both to the housing and between the portions of the piston assembly. The valving devices are provided in the form of a pair of umbrella valves selectively engageable in overlapping, sealing relationship with the recesses in the housing and arranged to spring back from the recesses upon movement of the valve member. The detent arrangement includes grooves formed in the valve member and a pair of opposed, spring loaded detents or balls adapted to fit in the grooves with the force on said detents or balls being adjustable exteriorily of the valve.

The various features of novelty which characterize this invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

The invention and its attendant objects and advantages will become better understood by reference to the following detailed description of the preferred embodiment when read in conjunction with the following drawings wherein.

DETAILED DESCRIPTION OF THE PREFERRED EMBODIMENT

Figure 1:
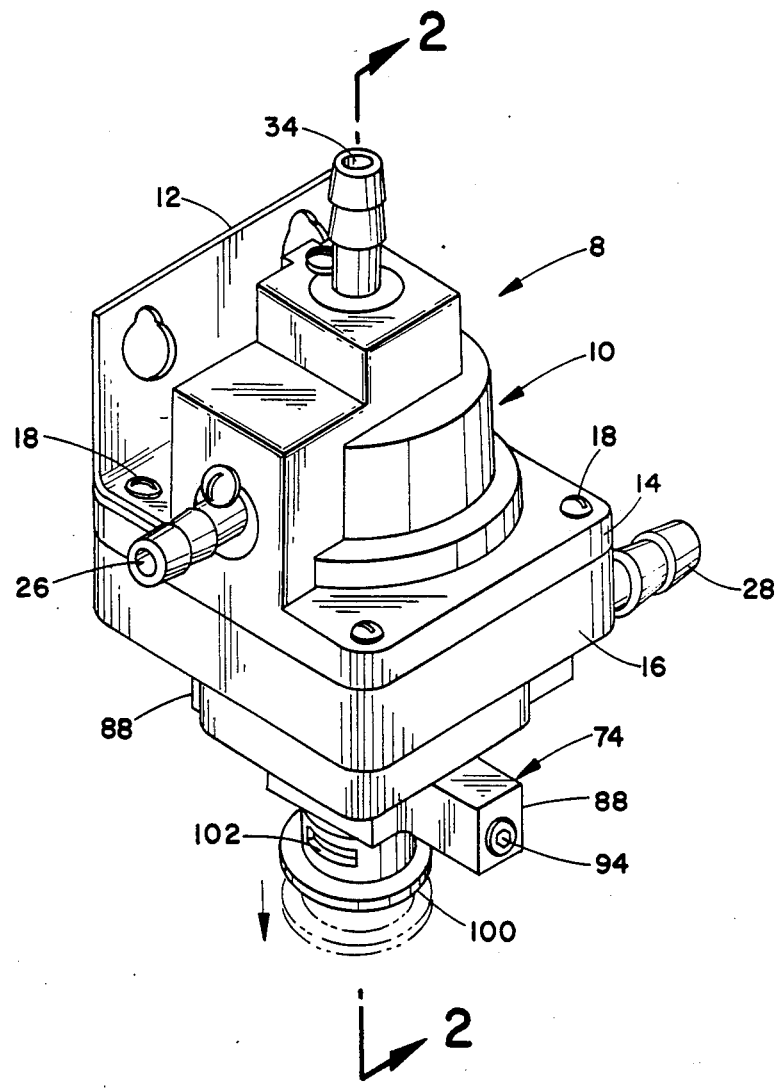
FIG. 1 is a perspective view of the switching valve of this invention.
Figure 2:
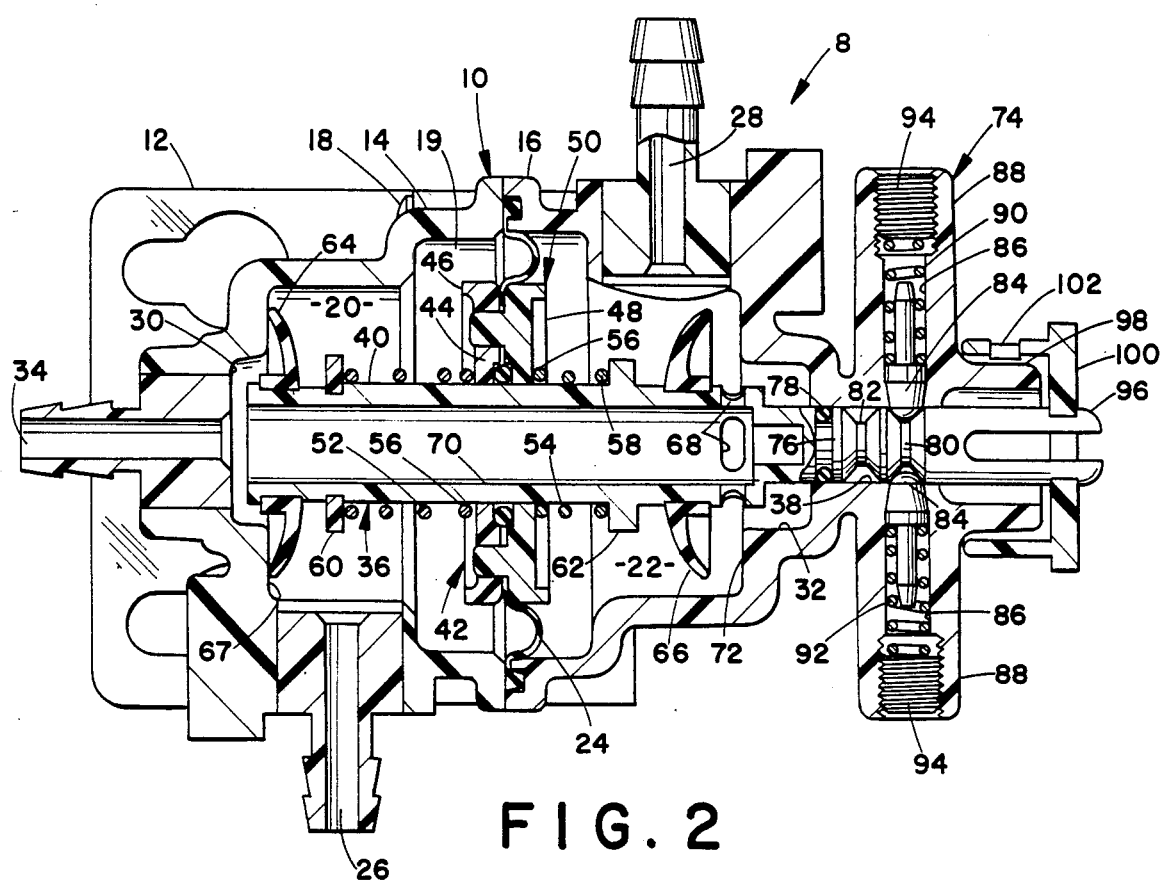
FIG. 2 is a cross sectional view taken along line 2—2 of FIG. 1 showing the valve in one operation position.
Figure 3:
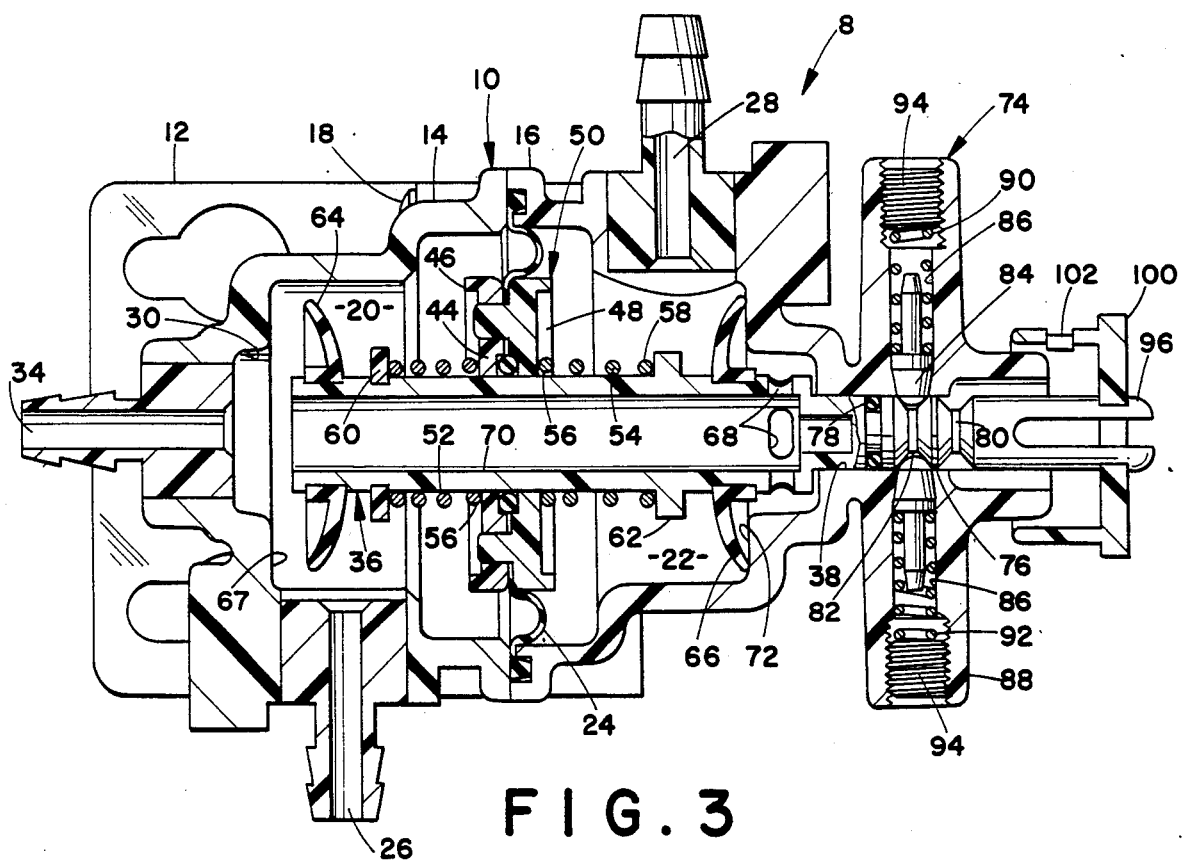
FIG. 3 is a cross sectional view similar to FIG. 2, showing the valve in a second operating position.

Referring now to the drawings, FIGS. 1-3, a switching valve is generally indicated by the numerical 8. The valve 8 includes a housing 10 which may be mounted to any suitable surface by a bracket 12, and has two portions 14, 16 integrally molded from a suitable, durable plastic material such as Celcon and joined together by fasteners 18. The housing portions 14, 16 together define an internal compartment 19 which is divided into two chambers 20, 22 by a flexible, convoluted diaphragm 24, the outer edges of which are sealingly clamped between the portions 14, 16. Chamber 20 is provided with an inlet 26 and chamber 22 is furnished with another inlet 28, each inlet 26, 28 being in communication with a source of fluid pressure. Such source may typically comprise a replaceable and collapsible bag/box package (not shown) containing liquid food stuffs such as milk, beverages, or concentrates or other liquid chemicals, such as coatings, inks or the like. Chamber 20 is provided with a recess 30 communicable with inlet 26 while chamber 22 is likewise constructed with another recess 32. Recess 30 opens into an outlet 34 that communicates with a pump which, as will be appreciated hereafter, can draw liquid from either of the inlets 26, 28 to the outlet 34 and any suitable dispensing apparatus connected to the pump.

A valve member in the form of an elongated spool 36 is aligned with the recesses 30, 32 and is movable longitudinally in the housing compartment 19 and within a bore 38 in the housing portion 16. The spool 36 is a one piece member preferably constructed from a suitable plastic material, like Celcon, and machined into a number of sections for carrying and engaging other key components of the valve 8. More specifically, the large diameter section 40 of the spool 36 provides a slidable mounting surface for a pressure responsive seal 42. This seal is composed of the flexible diaphragm 24 sandwiched at a central region 44 between two halves 46, 48 of a piston assembly 50 joined together such as by ultrasonic welding and formed from Celcon. On each side of the pressure responsive seal 42, is a compression spring 52, 54 encircling the spool 36 and having an inner end 56 abutting one face of a piston half 46, 48. An outer end 58 of each spring is disposed against a stop element or retainer 60, 62 provided radially outwardly of the spool 36 and defining the outer limit of travel of the springs 52, 54. With this construction, the pressure responsive seal 42 is slidably disposed for limited travel on the spool 36.

Mounted for movement with the spool 36 are valving means in each of the chambers 20, 22 for controlling the flow of fluid from each of the inlets 26, 28 to the outlet 34. The valving means are comprised by a pair of opposed, spaced apart umbrella valves 64, 66, each of which has an annular cup shape. Umbrella valve 64 is fixed on one end of the spool 36 adjacent the outlet 34 and is selectively engageable with a wall 67 of the compartment 19 in overlapping, sealing relationship with the recess 30. The other umbrella valve 66 is retained on the spool 36 adjacent a series of ports 68 circumferentially formed in the periphery of the spool 36. These ports 68 communicate with a passageway 70 provided axially within the spool 36 for selectively channeling fluid from the inlet 28 to the recess 30 and the pump. The umbrella valve 66 is likewise selectively engageable with a wall 72 of the compartment 19 in overlapping, sealing relationship with the recess 32. Each of the umbrella valves 64, 66 has a flexing resilient construction which permits both efficient sealing of fluid flow from the inlet 26, 28 to the outlet 34 when desired but also provides a slight rebound or spring back of the valves 64, 66 from the respective recesses 30, 32 or valve seats, upon movement of the spool 36 which adds to the responsiveness of the switching valve 8.

In order to hold the valve 8 in either of two operative positions, a detent mechanism 74 is located to one side of the housing portion. The detent mechanism 74 operates on either side of the spool 36 at the reduced diameter end section 76 which slides in the bore 38 and is isolated from fluid flowing in the chamber 22 by means of a singular seal 78. This holding arrangement includes two grooves 80, 82 formed in the surface of the spool 36 and a pair of opposed, balls or detents 84 which lie in transverse bores 86 formed in a tower section 88 of the housing portion 16. The balls or detents 84 are biased into engagement with the grooves 80, 82 by springs 90, 92 which bear against setscrews 94 journaled at the ends of the tower section 88 and adjustable exteriorly of the valve 8. The spring loaded balls or detents 84 are adapted to fit into the grooves 80, 82 to hold the spool in two positions and are situated opposite each other so the force on the spool 36 is balanced. If a large, unbalanced force were applied to the spool 36, for example, if there were only one spring loaded ball, the friction force on the spool 36 might tend to cause the spool 36 to bind or stick and eventually misalign. With the balanced, opposed detent arrangement of the present invention, misalignment is minimized. Further, because of the setscrews 94 and springs 90, 92, the forces on the balls or detents 84 may be equally adjusted to any desired valve depending on the operating application or environment.

The remainder of the reduced diameter end section 76 of the spool 36 terminates in a bifurcated portion 96, which projects outwardly from an extension 98 on the housing portion 16. The bifurcated portion 96 is deformable to allow a cap 100 to be snapfit upon it, the cap 100 being slidably engageable back and forth upon the outer surface of the extension 98. The cap 100 is provided with an indicia window 102 assuming either of the two positions of the spool to indicate which fluid source is being drawn and serves additionally as a manual override to provide manual selection of the fluid source to be drawn if desired at any time.

Operation of the switching valve 8 is as follows: With the spool 36 in its first position, as shown in FIG. 2, with the balls or detents 8 in groove 80, the umbrella valve 64 seals off flow from the inlet 26 to the recess 30 and outlet 34. However, in this position, the other umbrella valve 66 is spaced from the recess 32 so fluid may flow from the source and inlet 28, through the ports 68 and axial passageway 70, to the recess 30, outlet 34 and pump where fluid may be dispensed. Thus, the volume of liquid from the source feeding inlet 26 is left untapped, while the other source feeding inlet 28 is progressively metered through the valve 8.

This flow behavior is maintained until the volume of liquid in the source feeding inlet 28 is depleted to such a level that a high negative pressure or vacuum is generated in chamber 22 and applied to the pressure responsive seal 42. This vacuum creates a pressure differential which is sensed on the right side of the seal and pulls the diaphragm 24 and piston assembly 50 slowly to the right. This motion compresses the spring 54 until the force on the balls 84 of the detent mechanism 74 is overcome, at which point the compressed energy from the spring 54 is released and coacts with the springs 90, 92 from the detent mechanism to move the spool 36 to the right. As a result, as seen in FIG. 3, the balls or detents 84 fall into groove 82, ports 68 are moved into the recess 32 and simultaneously the umbrella valve 66 sealingly overlaps the recess 32 to prevent further flow of liquid from the inlet 28 to the outlet 34. Meanwhile, movement of the spool 36 to the right has caused the umbrella valve 64 to move away from the recess 30 so that fluid is automatically switched to flow from inlet 26 directly through the recess 30 and outlet 34 to the pump. As a feature of the invention, each umbrella valve 64, 66 is formed of an elastomeric material and possesses a curvature which will actually provide a rebound or spring back effect as the umbrella valve is released from its appropriate recess 30, 32. After umbrella valve 66 closes off the recess 32, the source feeding the inlet 28 may be replaced without deleteriously affecting the flow in the other inlet 26. Thus, each actuation of the pressure responsive seal 42, whether manually by pushing or pulling of the cap 100, or automatically by creation of pressure differential, due to the sources becoming depleted, results in changeover of the source feeding liquid to the pump.

It should be appreciated that the springs 52, 54 acting against the pressure responsive seal 42 cooperate with the springs 90, 92 of the detent mechanism to provide an efficient, snap acting valve. Otherwise stated, the resultant forces provided by the four springs 52, 54, 90, 92 serve to assist the movement of the spool 36 and umbrella valves 64, 66 so as to improve responsiveness and minimize flow interruption. Additionally, the diaphragm 24 and piston assembly 50, as employed, are sensitive to the pressure differentials created by depletion of the fluid sources and require only a short range of movement to trigger the desired changeover. The valve mechanism is simple and easily timed so that fluid communication opens and closes at the proper time, and due to the detent mechanism, is balanced to reduce the opportunity for hang ups and jamming and to increase the probability of smooth operation. Because of the construction and arrangement of the umbrella valves 64, 66 and the plastic construction of the housing 10, spool 36 and piston assembly 50, the mechanism is likely to experience less wear than devices of the prior art. Also, because of the simple arrangement and small number of the parts employed, the valve is easily assembled/disassembled and maintained.

Unlike prior art devices, the present invention does not rely upon O ring seals for controlling the flow of fluid from the inlets 26, 28 to the outlet 34 and pump. In addition, the invention enables the switching of fluids at various pressure differential levels as dictated by the force on the spool 36 by the adjustable detent mechanism. Furthermore, the plastic, preferably Celcon, components of the valve are extremely durable, self lubricating and manufactured without need for precison machining or molding.

The present invention thus furnishes an improved automatic switching valve with manual override which effectively transfers fluid flow between inlets to a pump upon detection of a predetermined pressure differential in one of the inlets. The arrangement further provides a superior sensing and reactive design, which is lightweight and compact.

While a particular embodiment of this switching valve has been shown and described, it will be obvious to persons skilled in the art that changes and modifications might be made without departing from the invention in its broader aspects. It is the aim of the dependent claims to cover all such changes and modifications as fall within the true scope and spent of the invention.

What is claimed is:

1. A switching valve comprising:
   a. a housing having spaced apart fluid inlets, an outlet and an internal compartment;
   b. a valve member longitudinally movable in said compartment due to a pressure differential in one of said fluid inlets to a first position in which one of said inlets communicates with said outlet and a second position in which the other of said inlets communicates with said outlet;
   c. pressure responsive sealing means secured in said housing and dividing said compartment into a pair of chambers, each chamber having one of said fluid inlets, said pressure responsive sealing means being slidably disposed for limited travel on said valve member;
   d. a valving means mounted on said valve member in each of chambers for controlling the flow of fluid from each of said inlets to said outlet;
   e. biasing means mounted on said valve member and acting on each side of said pressure responsive sealing means for assisting the movement of said valve member and said valving means; and
   f. adjustable detent means located at one end of said valve member for retaining said valve member at first and second positions, said biasing means and said detent means cooperating together to ensure a snap action switch between said first and second positions.

2. A switching valve as recited in claim 1, wherein said valve member includes circumferentially spaced ports and an axial passageway in communication with said ports for channelling fluid from one of said inlets to said outlet.

3. A switching valve as recited in claim 2, further comprising a pair of recesses in said housing; said ports being movable into and out of one of said recesses, and the other of said recesses lying between one of said inlets and said outlet.

4. A switching valve as recited in claim 3, wherein said valve member includes retainers defining the outer limits for said biasing means, said retainers being positioned intermediate said valving means.

5. A switching valve as recited in claim 4, further comprising indicia and manual override means secured on one end of said valve member externally of said valve for indicating which of said fluid inlets is in communication with said outlet and providing manual control of valve member at any time.

6. A switching valve as recited in claim 5, said adjustable detent means comprising grooves formed in said valve member and a pair of opposed, spring-loaded detents adapted to fit in said grooves, the force on said detents being adjustable exteriorily of said valve.

7. A switching valve as recited in claim 3, said valving means comprising a pair of umbrella valves selectively engageable with the walls of said internal compartment in overlapping, sealing relationship with said recesses, said umbrella valves constructed and arranged to spring back from said recesses upon movement of said valve member.

8. A switching valve as recited in claim 7, said pressure responsive sealing means comprising a piston assembly having first and second portions and a flexible, convoluted diaphragm secured at its outer periphery to said housing and at a central region between said first and second parts of said piston assembly.

9. A switching valve as recited in claim 8, wherein said housing, said valve member and said piston assembly are comprised of Celcon material.

10. A switching valve as recited in claim 7 one of said umbrella valves lying adjacent said outlet and the other of said umbrella valves lying adjacent said ports.

11. In a switching valve having a housing formed with spaced apart fluid inlets, an outlet and recesses controlling flow from each of said inlets to said outlet, and a pressure sensitive valve member movable in said housing due to a pressure differential in said fluid inlets to one position in which one of said inlets communicates with said outlet, and another position in which the other of said inlets communicates with said outlet, the combination including;

a. resilient, umbrella-shaped valve means mounted on said valve member to selectively and deformably engage said housing in overlapping relationship to one of said recesses in one position and to rebound from one of said recesses upon movement of said valve member to another position;

b. biasing means encircling said valve member for assisting the movement of said valve member and said umbrella-shaped valve means; and c. adjustable detent means located at one end of and on either side of said valve member for retaining said valve member at its positions.

12. The switching valve as recited in claim 11 wherein said pressure sensitive valve member includes an elongated spool, and a diaphragm assembly mounted for movement on said spool.

13. A switching valve as recited in claim 11, wherein said biasing means comprises a pair of compression springs, each being located on a side of said diaphragm assembly.

14. A switching valve as recited in claim 11, wherein said adjustable detent means includes, on either side of said valve member, grooves formed in said valve member, a detent engageable with grooves, a spring acting against said detent and a setscrew bearing against said spring and adjustable exteriorily of said valve.

15. A switching valve as recited in claim 11, where said valve means comprises a pair of, opposed, spaced annular cups, one of said cups lying adjacent said outlet and the other of said cups lying between said biasing means and said detent means.

16. A switching valve comprising;

a. a housing having first and second fluid inlets, an outlet and an internal compartment;

b. an elongated valve spool longitudinally movable in said compartment due to a pressure differential in one of said fluid inlets to a first position in which one of said inlets communicates with said outlet and a second position in which the other of said inlets communicates with said outlet;

c. a piston diaphragm assembly securing to said housing and dividing said compartment into a pair of chambers, each chamber having one of said fluid inlets, said piston diaphragm assembly being slidably disposed for limited travel on said spool;

d. an umbrella valve mounted on said spool in each of said chambers for controlling the flow of fluid from each of said inlets to said outlet;

e. compression springs secured on said spool and acting on each side of said piston diaphragm assembly for assisting the movement of said spool and umbrella valve; and f. spring biased detents located at one end of the valve for retaining said spool in balance at said first and second positions, said springs and detents coacting together to provide a snap action switch between said first and second positions.

* * * * *